I. M. JONES

APPARATUS FOR STRETCHING SKINS AND LEATHER

Jan. 13, 1931.

Original Filed April 9, 1925

Re. 17,929

2 Sheets-Sheet 1

Inventor

Ira Milton Jones

I. M. JONES

APPARATUS FOR STRETCHING SKINS AND LEATHER

Jan. 13, 1931.

Re. 17,929

Original Filed April 9, 1925 2 Sheets-Sheet 2

Inventor

Ira Milton Jones

Reissued Jan. 13, 1931

Re. 17,929

UNITED STATES PATENT OFFICE

IRA MILTON JONES, OF MILWAUKEE, WISCONSIN, ASSIGNOR TO CARL A. BECHSTEIN AND EWALD E. KORNETZ, OF MILWAUKEE, WISCONSIN

APPARATUS FOR STRETCHING SKINS AND LEATHER

Original No. 1,632,551, dated June 14, 1927, Serial No. 21,830, filed April 9, 1925. Application for reissue filed April 6, 1929. Serial No. 353,232.

This invention has as a general object the simplification and lightening of apparatus of the character described in order to facilitate their handling and to cheapen their cost of production.

Another object of this invention resides in the provision of an apparatus for stretching and drying skins, leather and other materials having a plurality of attaching surfaces arranged for movement in a common plane, a driving or operating member and connections between the driving and operating member for effecting simultaneous movement between the attaching surfaces.

It is another object of this invention to provide an improved apparatus or frame for stretching and drying skins, leather and other materials having a plurality of work engaging surfaces and guide means on which the work engaging surfaces are so mounted as to be movable in a common plane and individually adjustable.

A further object of this invention resides in the provision of means permitting rotational motion of the attaching members whereby the distribution of stresses on the skin, leather or other material being stretched is automatically equalized.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which.

Figure 1:
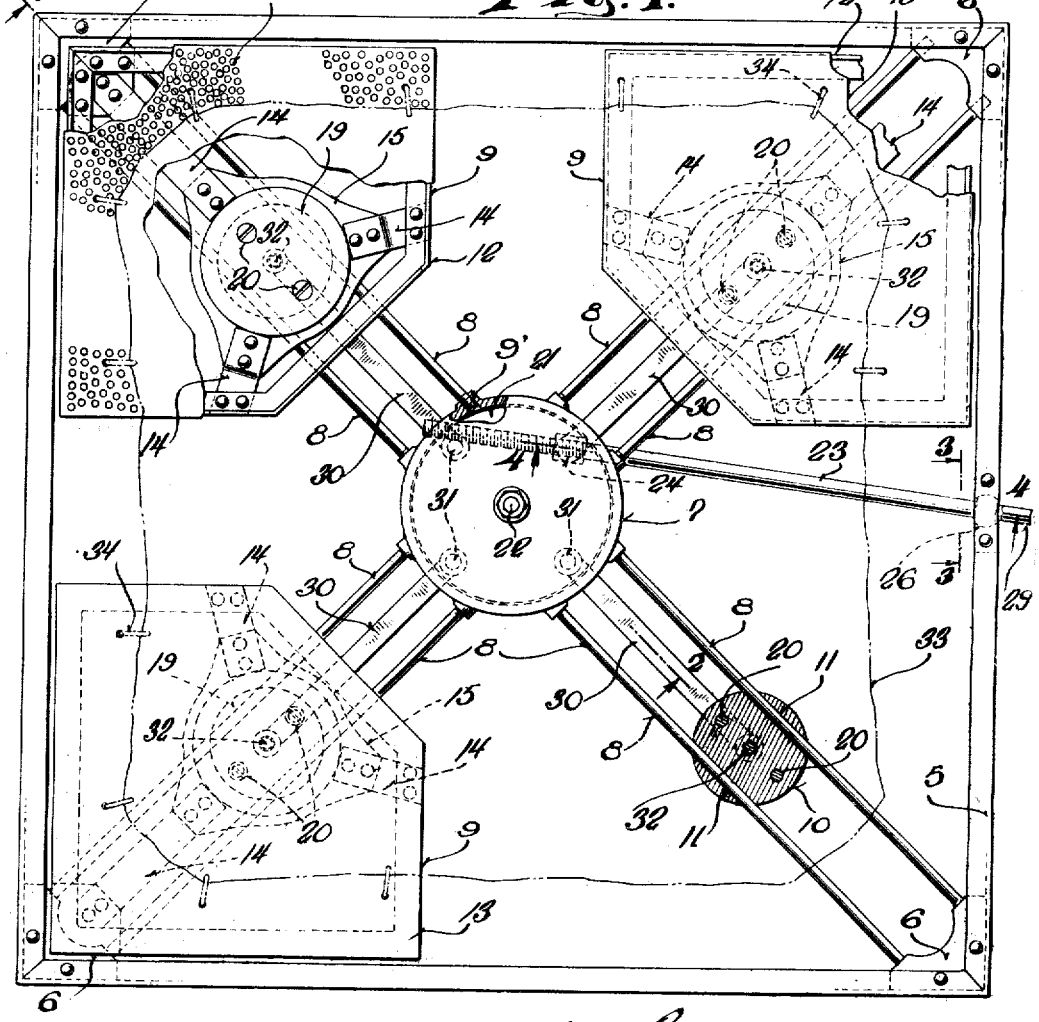
Figure 1 is a view, partly in section and partly in elevation, of an improved frame constructed in accordance with my invention, a skin or other material being illustrated in dotted lines as attached thereto.
Figure 2:
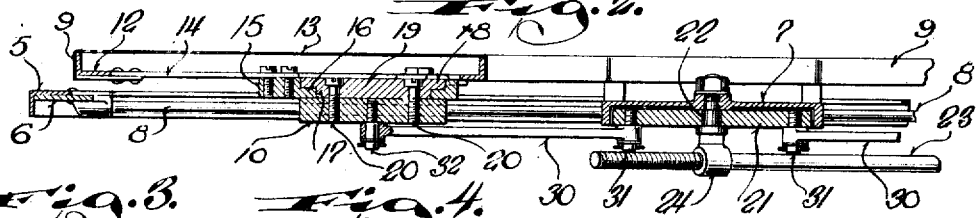
Figure 2 is a fragmentary, sectional view taken through Figure 1 on the plane of the line 2—2.
Figure 3:
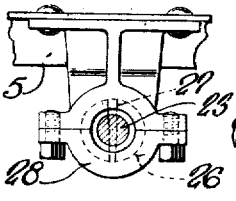
Figure 3 is a fragmentary detail view of the manner of mounting the outer end of the actuating shaft.
Figure 4:
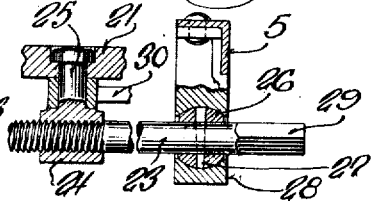
Figure 4 is a fragmentary sectional view taken through Figure 1 on the plane of the line 4—4.

Referring now more particularly to the accompanying drawings in which like numerals designate like parts throughout the several views, the numeral 5 designates a rectangular supporting frame preferably constructed of angle iron and reinforced at its corners by corner pieces or castings 6 and positioned centrally of the frame 5 is a casting or housing 7 which is mounted in place by pairs of brace rods 8 providing guides for the members 9, to be later described. The brace or guide rods 8 are arranged in pairs and have their inner ends threaded in the central casting or housing 7, as at 9′, and their outer ends suitably secured in the corner members 6.

Slidably mounted on each pair of brace or guide rods 8 is a cross-head 10 on which the frame members 9 are rotatably mounted, each cross-head being preferably in the form of a casting or other construction having two parallel guide openings 11 therein through which its supporting brace or guide rods 8 slide. Each frame member 9 is preferably constructed from angle iron 12 and, in the present embodiment, is of rectangular shape with the inner-most corner cut away, the frame being covered with a foraminous member 13 which provides an attaching surface.

Extended inwardly from the sides of each frame are braces 14 which firmly mount an annular ring 15 at a medial point, the inner periphery of the ring being counter-bored to provide an inwardly projecting flange 16 which engages in an annular channel or groove 17 formed between the extended peripheral edge portion 18 of a clamping plate 19 and the adjacent cross-head 10, the clamping plate 19 being removably secured to the cross-head by bolts or other means 20. This arrangement firmly mounts each frame 9 in the frame 5 for movement radially of the casting or housing 7 and permits an individual rotational motion of each frame 9 about the axis of its cross-head, and at the same time retains the frames in a common plane at all times.

The movement of the frames 9 is coordinated by a driving or operating member 21 rotatably mounted in the casting or housing 7 by a pivot bolt 22 and adapted to be rotated by an actuating shaft 23, the inner end of which is threaded in an internally threaded sleeve 24 eccentrically fixed to the driving or operating member by a pivot bolt 25. The outer end of the shaft 23 is rotatably, but non-longitudinally shiftably, supported from one side angle member of the frame 5 by a socket member 26 splined thereto, as at 27, and journaled in a socket bearing 28 suspended from the adjacent frame side. The outer end of the shaft 23 is squared, as at 29, for convenience in applying an actuating crank thereto and, as will be readily apparent, rotation of the shaft to screw the inner end thereof in the sleeve 24 tends to rotate the driving or operating member 21 in a clockwise direction with respect to Figure 1 and a rotation of the shaft in a reverse direction tends to rotate the member 21 in a counter-clockwise direction.

The rotational movement of the driving or operating member 21 is transmitted to the frames 9 by connecting members or toggle links 30, the inner ends of which are eccentrically, pivotally connected with the member 21 by crank pins 31 carried thereby to one side of its axis and the outer ends of the links are pivotally connected, as at 32, to the cross-heads 10. One of the members 30 has its inner end eccentrically connected with the driving or operating member 21 by the pivot 25 securing the threaded sleeve 24 thereto.

In operation the skin, leather or other material to be stretched, designated 33, is attached to the apparatus by hooks or other members 34 which are engaged with the edges of the material and in the apertures of the attaching surface. Shaft 23 is then rotated to thread its inner end into the sleeve 24 rotating the operating or driving member 21 in a clockwise direction with respect to Figure 1 causing the members 30 to move the frames 9 outwardly toward their positions illustrated in Figure 1, stretching the material as will be readily apparent. Should the operator in placing material 33 on the frame dispose unequal strains thereon, the members 9 independently rotate about the cross-heads 10 to equalize the strains as will be readily apparent.

Figure 5:
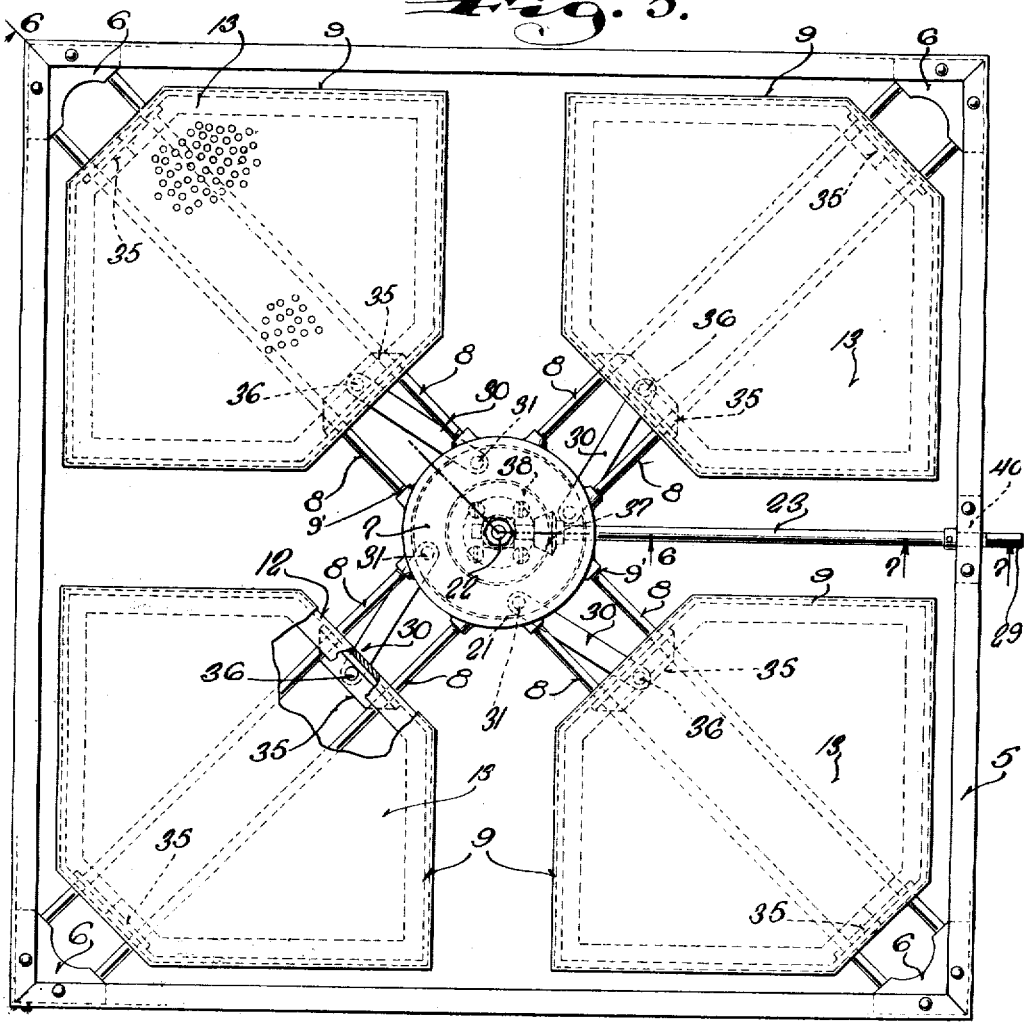
Figure 5 is a front elevational view of a slightly modified form of my invention.
Figure 6:
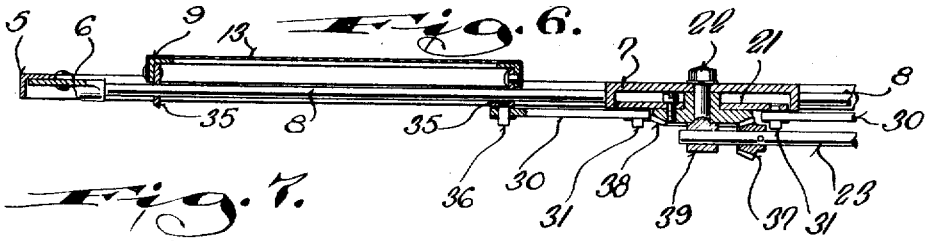
Figure 6 is an enlarged fragmentary sectional view taken through Figure 5 on the plane of the line 6—6.
Figure 7:
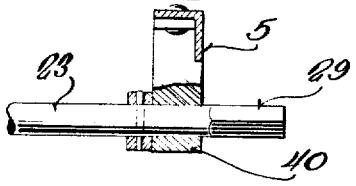
Figure 7 is a fragmentary detail sectional view taken through Figure 5 on the plane of the line 7—7.

In that form of my invention illustrated in Figures 5, 6 and 7, the construction is identical with that illustrated in Figures 1 to 4, inclusive, except that the frames 9 are held against rotation and the construction thus materially simplified and lightened. The frames 9 in this form of my invention are slidably mounted on the guide rods 8 by slides 35 fixed to the opposite ends of the frame 9 which slidably engage the rods. The toggle links 30 for engaging the driving or operating member with the frames 9 have their outer ends pivotally connected with the inner-most slide members, as at 36, and the operating shaft 23 is connected with the member 21 by a beveled gear 37 fixed to its inner end and meshed with a bevel gear 38 fixed to the member 21. The inner end of the shaft 23 in this form of my invention is journaled in a bearing 39 formed on the pivot pin 22 of the member 21 and the outer end of the shaft 23 is journaled in a bearing 40 suspended from the adjacent side of the frame 5.

The operation of this form of my invention is identical with that form illustrated in Figure 1 with the exception that the frames 9 are held against rotational movement and, therefore, a further detail description thereof is deemed unnecessary.

What I claim as my invention is:

1. An apparatus of the character described, comprising a plurality of frame members having work engaging surfaces, means mounting the frame members for movement in a common plane, an operating member, means rotatably mounting the operating member medially of the frame members, connecting members having their inner ends eccentrically connected with the operating member and their outer ends connected with the frame members, whereby rotation of the operating members moves the frame members in a common plane, and means operable from one side of the apparatus for rotating the operating member.

2. An apparatus for stretching skins and leather comprising a main supporting frame structure, a plurality of movable frame members substantially within the main supporting frame structure, guide members in the frame structure radiating from the center thereof and mounting the frame members for movement in a common plane, an operating member mounted in the main frame structure between the frame members, and connections between the operating member and the frame members whereby actuation of the operating member moves the frame members in a common plane.

3. An apparatus of the character described, comprising a main supporting frame structure, a plurality of movable frame members substantially within the main supporting frame structure, guide members in the frame structure and radiating from the center thereof for mounting the frame members for movement in a common plane, a housing mounted in the main frame structure between the frame members, an operating member journaled in the housing, and connecting members having their inner ends eccentrically secured to the operating member and their outer ends connected with the frame members whereby rotation of the operating member moves the frame members on the guide members.

4. An apparatus for stretching skins and leather, comprising a plurality of frame members having work engaging surfaces, means mounting the frame members for movement only in a common plane and permitting rotation thereof on an axis transversely of the plane of movement, an operating member mounted medially of the frame members, means connecting the operating members with the frame members, and means for driving the operating member whereby its motion is transmitted to the frame members to produce movement thereof in a common plane.

5. An apparatus for stretching skins and leather, comprising a main supporting frame structure, guides mounted in the main frame structure, cross-heads slidably mounted in the main frame structure by the guides, frame members having work engaging surfaces, means mounting a frame member on each cross-head, an actuating member mounted between the frame members, and means connecting the actuating member with the cross-heads, whereby operation of the actuating member causes movement of the frame members in a common plane.

6. An apparatus of the character described, comprising a main supporting frame structure, guides mounted in the main frame the main frame structure by the guides, frame members having work engaging surfaces, means mounting a frame member on each cross-head for rotation on an axis transversely of the guides, an actuating member mounted between the frame members, and means connecting the actuating member with the cross-heads, whereby operation of the actuating member causes movement of the frame members in a common plane.

7. An apparatus for stretching skins and leather, comprising a plurality of frame members having work engaging surfaces, means mounting the frame members for movement only in a common plane and permitting rotation thereof on an axis transversely of the plane of movement, and means for producing movement of the frame members in a common plane.

8. An apparatus for stretching skins and leather comprising a hub member, guide means radially extended from the hub member, a plurality of movable frame members having work engaging surfaces, means connecting the frame members with the guide means whereby the frame members are movable in a common plane, an operating member, means mounting the operating member in the hub member, and means connecting the operating member with the frame members whereby actuation of the operating member moves the frame members in a common plane.

9. An apparatus of the character described comprising a main supporting frame structure, guide means within the frame structure, a plurality of movable frame members having work engaging surfaces, means connecting the frame members with the guide means whereby the frame members are movable in a common plane, and means for producing relative movement between the frame members.

10. An apparatus of the character described, comprising a rigid main supporting frame structure, guide means within the frame structure and fixed with respect thereto, a plurality of frame members having work engaging surfaces, means mounting the frame members from the guide means whereby the frame members are movable in a common plane and individually adjustable, and means for moving the frame members.

11. An apparatus for stretching skins and leather comprising a rigid main supporting frame structure, guide members located within the frame structure and fixed with respect thereto, a plurality of movable frame members having work engaging surfaces, means for connecting the frame members with the guide members whereby the frame members are movable in a common plane, the line of movement of the guide members being radial with respect to a point medial of the main frame structure, and means for moving the frame members.

12. An apparatus of the character described comprising a rigid supporting frame structure, guide means within the frame structure and fixed with respect thereto, a plurality of movable frame members having work engaging surfaces, means for connecting the frame members with the guide means whereby the frame members are movable in a common plane, and means for moving the frame members in a radial line with respect to a point medial of the frame structure.

In testimony whereof I have hereunto affixed my signature.

IRA MILTON JONES.

CERTIFICATE OF CORRECTION.

Reissue Patent No. 17,929. Granted January 13, 1931, to

IRA MILTON JONES.

It is hereby certified that the name of the second mentioned assignee in the above numbered patent was erroneously written and printed as "Ewald E. Kornetz", whereas said name should have been written and printed as Ewald E. Kornitz, as shown by the records of assignments in this office; and that the said Letters Patent should be read with this correction therein that the same may conform to the record of the case in the Patent Office.

Signed and sealed this 17th day of February, A. D. 1931.

M. J. Moore,
Acting Commissioner of Patents.

(Seal)